US008538603B2

(12) United States Patent
O'Connor et al.

(10) Patent No.: US 8,538,603 B2
(45) Date of Patent: Sep. 17, 2013

(54) AIRCRAFT AVIONICS SYSTEM (75) Inventors: Daniel O'Connor, Ennetmoos (CH);
Bruno Cervia, Buochs (CH); Robert Milns, Buochs (CH); Paul Gibson, Alpnachstad (CH)

(73) Assignee: Pilatus Flugzeugwerke AG, Stans (CH)

( * ) Notice: Subject to any disclaimer, the term of this patent is extended or adjusted under 35 U.S.C. 154(b) by 0 days.

(21) Appl. No.: 13/387,379

(22) PCT Filed: Jul. 28, 2009

(86) PCT No.: PCT/EP2009/059732
§ 371 (c)(1),
(2), (4) Date: Feb. 21, 2012

(87) PCT Pub. No.: WO2011/012156
PCT Pub. Date: Feb. 3, 2011

(65) Prior Publication Data
US 2012/0143406 A1    Jun. 7, 2012

(51) Int. Cl.
*G01C 23/00*    (2006.01)
(52) U.S. Cl.
USPC .......................................................... 701/3
(58) Field of Classification Search
USPC .............................................. 701/3, 36; 342/29
See application file for complete search history.

(56) References Cited

U.S. PATENT DOCUMENTS

| | | | |
|---|---|---|---|
| 4,057,913 A | 11/1977 | Eisenberg | |
| 4,424,038 A | 1/1984 | Tingleff et al. | |
| 5,014,067 A * | 5/1991 | Chisholm | 342/407 |
| 6,262,679 B1 * | 7/2001 | Tran | 342/29 |
| 6,531,978 B2 * | 3/2003 | Tran | 342/29 |
| 6,646,588 B2 * | 11/2003 | Tran | 342/29 |
| 7,006,032 B2 * | 2/2006 | King et al. | 342/29 |
| 8,234,058 B1 * | 7/2012 | Barber et al. | 701/120 |
| 2003/0158963 A1 * | 8/2003 | Sturdy et al. | 709/238 |

FOREIGN PATENT DOCUMENTS

EP    0 732 677 A1    9/1996

OTHER PUBLICATIONS

Frain et al, CNS/ATM for Tactical Military Aircraft, The 22$^{nd}$ Digital Avionics Systems Conference, 2003, pp. 4.D.1-4.1-9.*
Happel, D.A. Proposed Avionics Architecture for Air Force Air Mobility Command Aircraft to Meet CNS/ATM and GATM Requirements, The 17$^{th}$ AIAA/IEEE/SAE Digital Avionics Systems Conference, 1998, pp. F16/1-F16/9.*
International Search Report from International Application No. PCT/EP2009/059732.
International Preliminary Report on Patentability for International Application No. PCT/EP2009/059732, issued Jan. 31, 2012.

* cited by examiner

*Primary Examiner* — Russell Frejd
(74) *Attorney, Agent, or Firm* — McCarter & English, LLP (57) ABSTRACT

An aircraft avionics system (10) for an aircraft, comprising includes a mission system (2), controlled by an open systems mission computer with a tactical communications system (320) and a tactical navigation system (220), The avionics system also includes a civil system (I), controlled by a flight management system with a civil communications system (310) and a civil navigation system (210), The mission system (2) is logically separated from the civil system (I) through separation of a navigation system (20) of the aircraft into a civil navigation system (210) and a tactical navigation system (220), and through separation of a communications system (30) of the aircraft (100) into the tactical communications system (320) and the civil communications system (310), and through the independence of the open systems mission computer from the flight management system, The separation allows the civil system (I) to operate and be updated independently from the mission system (2).

13 Claims, 8 Drawing Sheets

AIRCRAFT AVIONICS SYSTEM

CROSS-REFERENCE TO RELATED APPLICATIONS

This application is the U.S. National Phase of International Application No. PCT/EP2009/059732, entitled "Aircraft Avionics System", filed on Jul. 28, 2009, the disclosure of which is hereby incorporated by reference in its entirety.

FIELD OF THE INVENTION

The present invention relates to an aircraft avionics system for an aircraft, especially to an aircraft avionic system for an aircraft with training and/or tactical functionality.

BACKGROUND OF THE INVENTION

Various avionics systems are employed within aircrafts that perform various functions therein. Aircrafts with a training and/or tactical functionality have the particular requirement that the avionics systems must be able to perform mission and/or tactical functions as well in addition to their civil functionality, i.e. the functionalities that are mandatory for the aircraft to receive the "safe to fly" certification from certification authorities. Such training aircrafts are suitable for training a pilot in a partially simulated environment. This simulated environment corresponds to a training/tactical syllabus that contains various scenarios prepared to train a pilot to react to such scenarios accordingly. As opposed to the civil functionalities, the tactical system components/functionality of a military trainer aircraft requires update on a frequent basis. This may be due to new requirements from the customer, or modification of previous requirements to better fit the tactical training syllabus. The cost associated with a full certification of these components is high when such systems include civil functionality. Civil functionality requires higher levels of compliance with certification and safety regulations. Higher levels of compliance entail a greater cost and workload in terms of testing, documentation and relations with the certifying authority. Thus, the repeated certification of the avionics system causes significant delays and also generates high costs after each update, even a minor one, of the tactical/mission systems.

The objective of the present invention is thus to provide an aircraft avionics system which overcomes the above-identified drawbacks, i.e. allowing a frequent update of the mission systems/functionality while reducing the requirement of a lengthy and cost intensive repeated certification of the avionics system with the certification authorities, while at the same time ensuring that such updates of the mission systems/functionality do not jeopardize the "safe to fly" designation of the aircraft.

SUMMARY OF THE INVENTION

The concept of the present invention is a system partitioning, i.e. ring-fencing the mission functionality from the rest of the avionics system through separation of systems and individual avionic units. By ensuring that the civil functionality is available within the avionics systems but is separate to the mission system, the cost of updating/certifying the mission system is reduced by allowing a lower level of regulation to be applied.

Thus, the above identified objectives of the present invention are solved by providing an aircraft avionics system for an aircraft, comprising a mission system, controlled by an open systems mission computer, said mission system comprising a tactical communications system; a tactical navigation system and a training system, said avionics system further comprising a civil system, controlled by a flight management system, said a civil system comprising a civil communications system; a civil navigation system, wherein said mission system is logically separated from the civil system through separation of a navigation system of the aircraft into said civil navigation system and said tactical navigation system and through a logical separation of a communications system of the aircraft into said tactical communications system and said civil communications system; and wherein a full separation of civil functionalities of the aircraft from tactical functionalities of the aircraft is thus provided, said separation allowing the civil system to operate independently from the mission system and allowing the mission system to be updated and maintained independently from the civil system.

According to the present invention, said logical separation of the mission system from the civil system ensures that the aircraft maintains all civil functionalities even in case of a complete failure or malfunction of the mission system. This ensures that the aircraft maintains its "safe to fly" certification no matter the status of the mission system.

In view of the drawbacks of the prior art, the objective of the present invention and the inventive solution summarized above, the present invention has the main advantage that through said logical separation of the mission system from the civil system, an independent update of the mission system is ensured. The independent update of the mission system allows a frequent update of the mission related functionalities of the aircraft requiring lower levels of repeated certification of the avionics system with the certification authorities. Thus considerable costs and valuable time is saved each time the mission system is updated due to new requirements from the customer, or modification of previous requirements to better fit the tactical training syllabus.

Furthermore this logical separation of the mission system from the civil system provides not only said certification but also a greater sense of security and flexibility in designing the training scenarios to be simulated by the mission system, since the trainee and/or trainer always has the option to shut down the mission system and safely land the aircraft.

In conclusion, the present invention not only ensures that the "safe to fly" certification is not lost due to updates in the tactical/training functionality but also that the mission system is prevented from being capable of causing a dangerous or critical situation for the aircraft.

DESCRIPTION OF PREFERRED EMBODIMENTS

Certain terms will be used in this patent application, the formulation of which should not be interpreted to be limited by the specific term chosen, but as to relate to the general concept behind the specific term.

In the context of the present application, mission functionality and corresponding mission system 2 shall mean the functionalities of a training aircraft which relate to the training of a pilot/trainee in an emulated environment within the aircraft. The mission functionalities further relate to tactical scenarios, simulated system failures, emulated warfare all these according to training syllabus.

The term civil functionality and corresponding civil system 1 shall mean in the context of the present application, the complete avionic system of the aircraft 100 which are essential for certifying the aircraft 100 as "safe to fly". The term shall further include additional systems which are not compulsory for a certification of the aircraft 100, but are optionally provided and have no or only partial training purposes.

The term aircraft shall mean in the context of the present application any kind of aircraft including recreational, civil but especially training aircrafts which are suitable for being fitted with the aircraft avionics system 10 of the present invention in order to provide mission training functionalities. Especially preferred types of aircrafts for the present invention are aircrafts with two cockpit positions one for a trainee and one for the instructor, with both cockpit positions fitted with individual controls. It shall be noted that the role of the two cockpit positions is interchangeable.

It is to be noted that on all figures of the application, tactical/mission related connections/components are shown with a dashed line and connections/components related to the civil functionalities are shown with a dotted dashed line.

The aircraft avionics system 10 according to the present invention is designed to complement the civil functionalities of a typical aircraft by emulating the main features of a modern fast jet cockpit. These features include, but are not limited to, large electronic displays for the presentation of flight and system data, electronic standby instruments, digital map and simulated representations of weapon capabilities, radar displays and electronic warfare.

The capabilities described above are those with a high variability in requirements between customers and between training scenarios. The mission system 2 of the aircraft 100 as described above is split from the civil functionality of the aircraft 100, i.e. from the civil system 1, through separation of systems and individual avionic units. This allows the mission system 2 to be updated and maintained at a unique rate, independently from the civil system 1 which ensures that the aircraft 100 maintains its certification.

The mission system 2 components/functionality of a military trainer aircraft 100 requires update on a frequent basis. This may be due to new requirements from the customer, or modification of previous requirements to better fit the tactical training syllabus. The cost associated with a full certification of these components is high when such systems include civil functionality. Civil functionality requires higher levels of compliance with certification and safety regulations. Higher levels of compliance entail a greater cost and workload in terms of testing, documentation and relations with the certifying authority. The concept of the present invention, i.e. tactical (mission) system partitioning is to ring-fence the mission system 2 from the rest of the system through separation of systems and individual avionic units. By ensuring that the civil system 1 is available within the aircraft avionics system 10 but is separate to the mission system 2, the cost of updating/certifying the mission system 2 is greatly reduced by allowing a lower level of regulation to be applied.

Figure 1A:
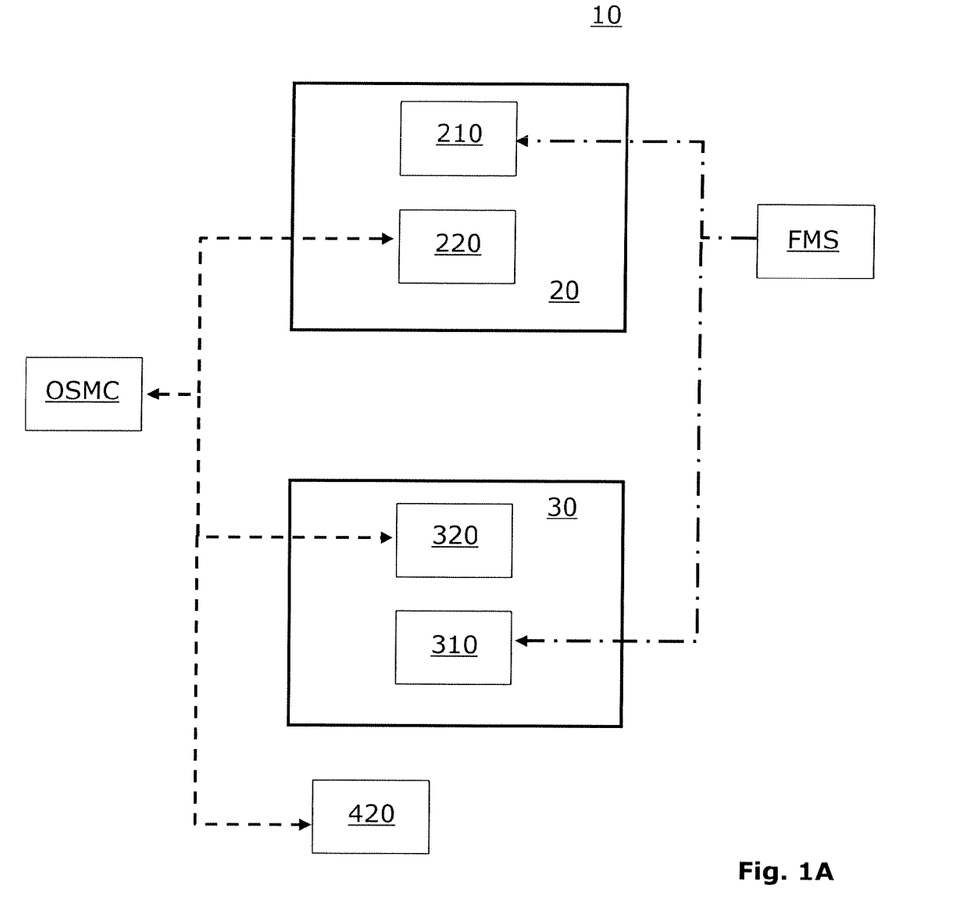
Fig. 1A is a functional block diagram of a first embodiment of the aircraft avionics system depicting the logical separation of the avionics systems according to the present invention.

FIG. 1A shows a functional block diagram depicting the logical separation of the civil system 1 from the mission system 2 according to the present invention. As shown on the figure, the aircraft avionics system 10 is split into two main logical units, i.e. the mission system 2 and the civil system 1.

The civil system 1 performs civil functions within the aircraft 100 such as civil communication, navigation and other essential functions for an aircraft 100. The civil system 1 is controlled by a flight management system FMS and comprises a civil communications system 310 and a civil navigation system 210. The flight management system FMS and the entire civil system 1 is certified with high levels of compliance with certification and safety regulations, such certification being carried out in collaboration with the certification authorities.

The mission system 2 is controlled by an open systems mission computer OSMC and comprises a tactical communications system 320, a tactical navigation system 220 and a training system 420. As seen on FIG. 1, the open systems mission computer OSMC is the central component of the mission system 2 and controls all communication therein. Due to the logical separation, the open systems mission computer OSMC and the mission system 2 in general must conform to significantly lower levels of regulation, which not only reduce deployment time but also reduce the certification costs as well. The training system 420 of the mission system 2 performs additional functions related to the training/tactical functions of the aircraft 100 such as simulated radars, simulated warfare, etc.

Furthermore, the aircraft avionics system 10 comprises several structural units, such as the navigation system 20 and the communications system 30.

The communications system 30 encompasses those equipment and system functions that are involved either in internal voice communication between the aircrew, between aircrew and ground crew, or external communication to the aircraft 100 using radio frequency RF as the transmission media to other aircrafts or ground based stations. Generally speaking, this involves the aircraft intercom, communication over the V/UHF radios, transponder responses and distress signals from the Emergency Locator Transmitter ELT. The structure of the communications system 30 will be described in detail in relation with figures depicting it.

The navigation system 20 comprises several units that combine available navigation data to determine the best navigation solution. Navigation data is presented to the pilot on multiple displays in the aircraft 100. Main navigation data is presented on a primary flight display PFD and secondary source of flight data is presented to the pilot on a secondary flight display SFD. These instruments are kept independent of each other, both in terms of sources of data and supporting systems such as power supplies. A head-up display HUD can be optionally installed as well. The structure of the navigation system 20 will be described in detail in relation with figures depicting it.

In conclusion, the aircraft avionics system 10 is split both into a civil system 1 and a mission system 2 and is also into a navigation system 20 and a communications system 30 respectively.

Figure 1B:
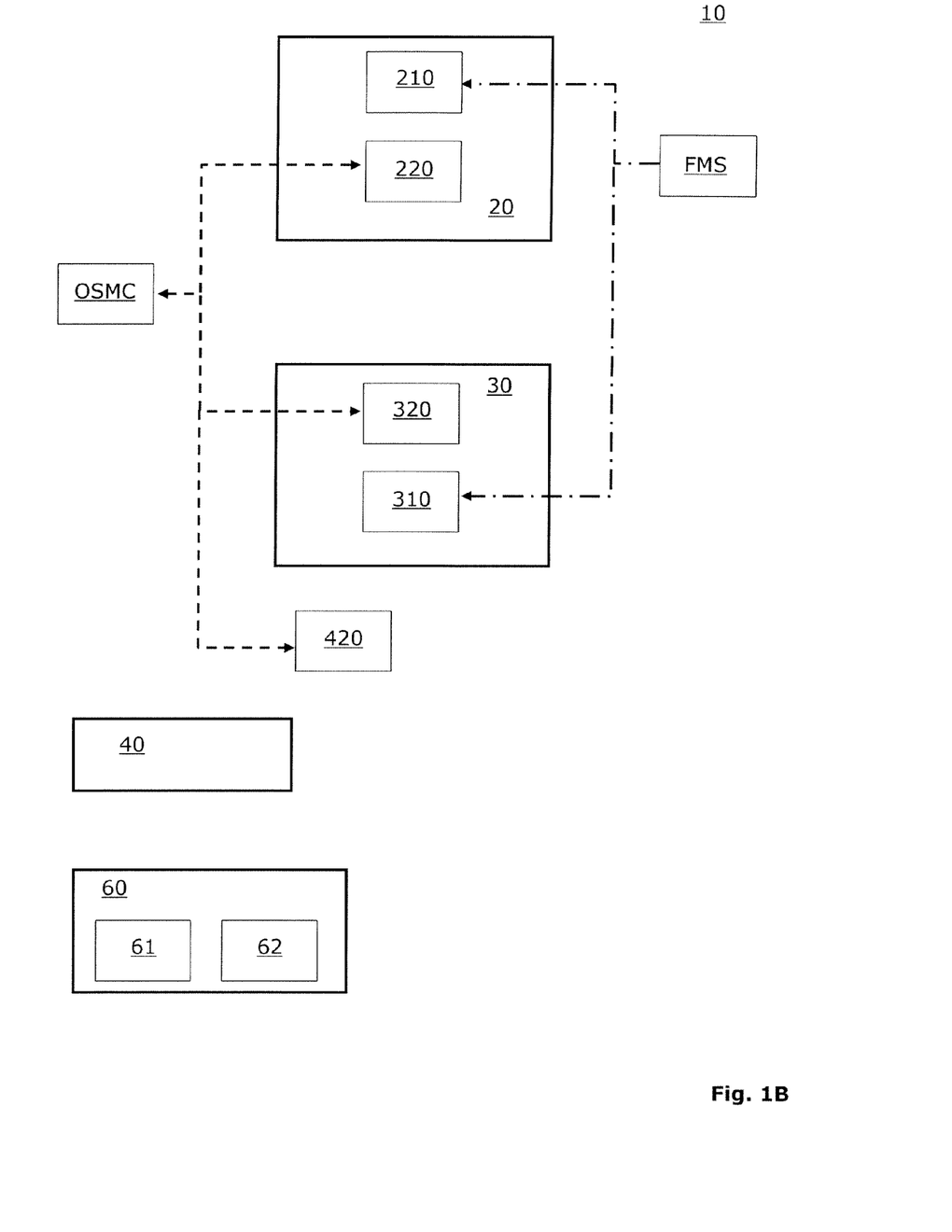
FIG. 1B is a functional block diagram of a preferred embodiment of the aircraft avionics system depicting further avionics systems.

FIG. 1B shows a functional block diagram of a preferred embodiment of the aircraft avionics system 10 depicting further avionics systems. Thus, according to this specific embodiment of the present invention, the aircraft avionics system 10 further comprises an electrical system 40 and a lighting system 60.

The electrical system 40 is a stand-alone system, designed to supply power to the various electronic units on the aircraft 100. As such, there is no logical split with this "service" system. The following functionality is supplied to both the civil system 1 and mission system 2. The distribution part of the electrical system 40 comprises several buses that are supplied with power from a multitude of sources. The electrical equipment of the aircraft 100 is partitioned between these buses allowing for redundancy of supplies and availability under failure conditions.

The lighting system 60 is a further stand-alone system, designed to provide appropriate lighting to the full external and cockpit environment through the various electronic units on the aircraft 100. As such, there is no logical split with this "service" system. The following functionality is supplied to both the civil system 1 and the mission system 2. The lighting system 60 is split into two areas, the external lighting system 61 and the internal lighting system 62. The external lighting system 61 relate to those illuminations that allow the pilot to operate the aircraft 100 with respect to outside world cues. The internal lighting system 62 are those associated with the ability to operate the aircraft 100 with respect to comfortably viewing displayed data on the electronic displays, and locating and identifying cockpit mounted switches.

Figure 2A:
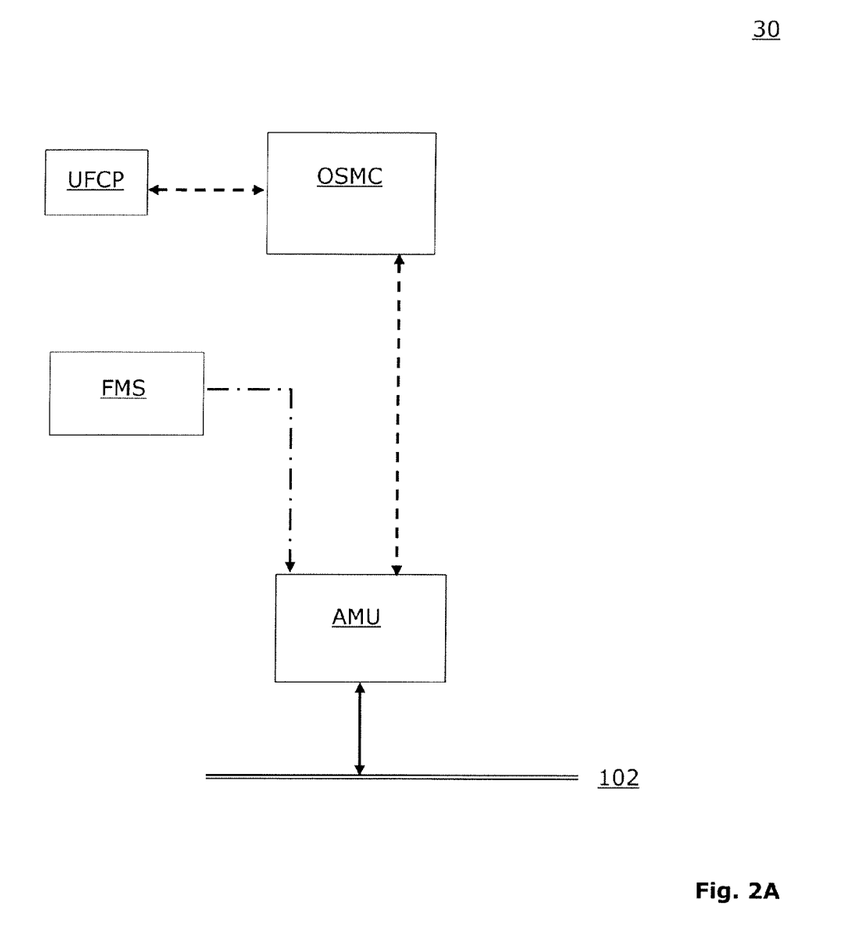
FIG. 2A is a structural block diagram depicting a first embodiment of the communications system of the aircraft avionics system according to the present invention.

FIG. 2A shows a structural block diagram depicting a first embodiment of the communications system 30 of the aircraft avionics system 10 according to the present invention. The communications system 30 encompasses those equipment and system functions that are involved either in internal voice communication between the aircrew, between aircrew and ground crew, or external communication to the aircraft 100 to other aircraft or ground based stations. The heart of the communications system 30 is the audio management unit AMU. This controls all audio signals within the aircraft 100. A single audio management unit AMU is used on the aircraft 100, which has multiple channels for hardware redundancy. Control of which channels are used is selected via the audio management unit.

The separation of the communications system 30 into a civil communications system 310 and tactical communications system 320 is clearly visible on this figure, the civil functionalities being controlled by the flight management system FMS and the tactical functionalities by the open systems mission computer OSMC. As shown here, both the open systems mission computer OSMC and the flight management system FMS are connected to the audio management unit AMU which manages the audio volumes and priority of outputs. Civil related connections are shown here with a dotted-dashed line and tactical connections with a dashed line. The pilot's interface with the tactical communications system 320 is the so-called up front control panel UFCP, a control panel where all setting of the tactical communications system 320 can be accessed by the pilot.

In order to communicate with other components, like various sensors for example, of the aircraft avionics system 10, the audio management unit AMU is connected to the I/O bus 102 of the aircraft 100.

Figure 2B:
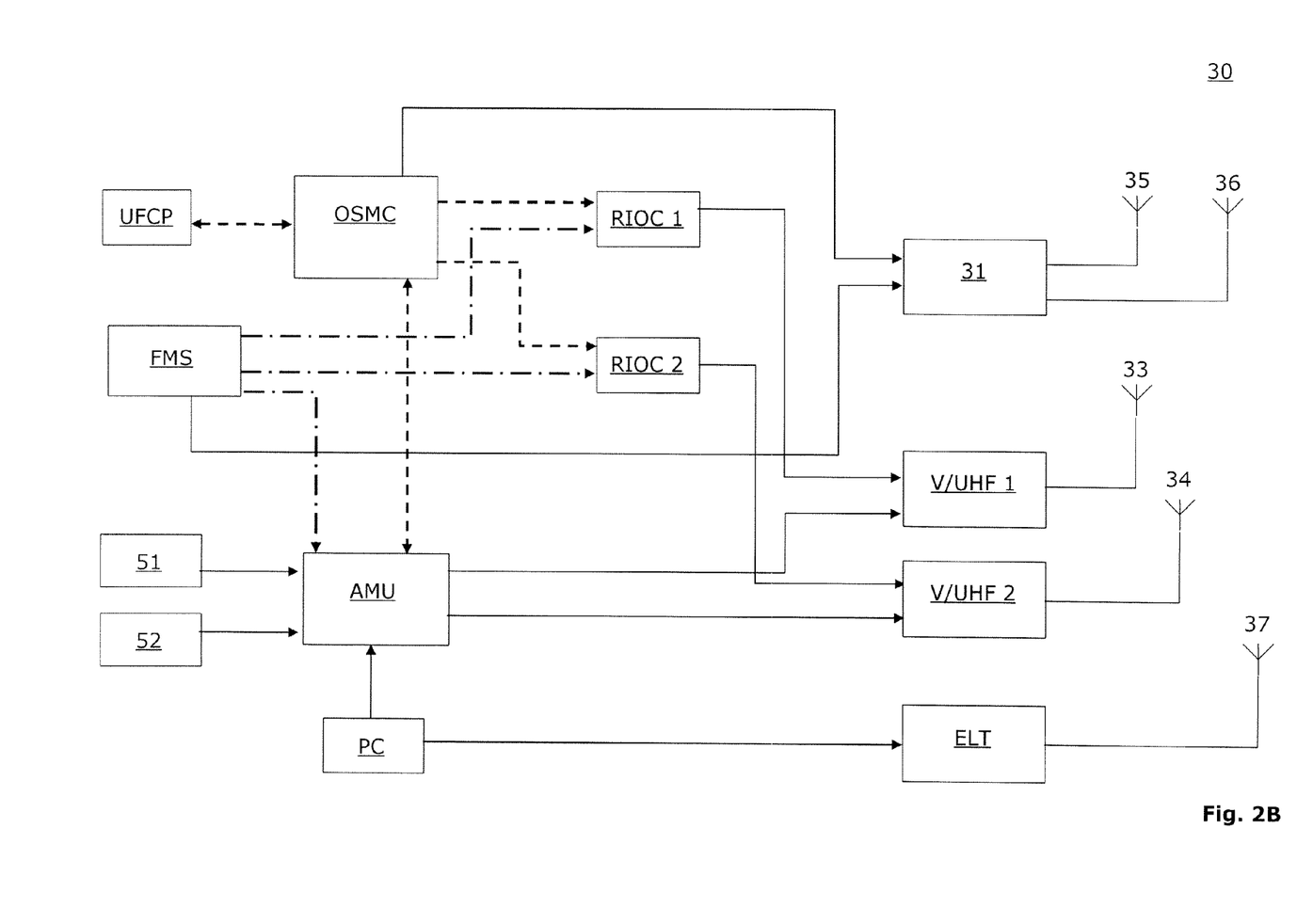
FIG. 2B is a structural block diagram depicting a preferred embodiment of the communications system of the aircraft avionics system according to the present invention.

FIG. 2B shows a structural block diagram depicting a preferred embodiment of the communications system 30 of the aircraft avionics system 10 according to the present invention. In this particular embodiment, the aircraft 100 comprises two cockpit positions each with associated controls, one cockpit position for a trainee and one for the instructor. The communications system 30 further comprises two V/UHF radios V/UHF 1 and V/UHF 2 with corresponding comm. 1 antenna 33 and comm. 2 antenna 34 respectively; a transponder 31 with corresponding upper antenna 35 and lower antenna 36; and the emergency locator transmitter ELT for transmission of distress signals with a corresponding emergency locator transmitter ELT antenna 37. The audio management unit AMU receives all speech signals from the cockpit headset and microphones 51 and the ground crew headset and microphone 52, and conditions them to an acceptable level suitable for the V/UHF radios V/UHF 1 and V/UHF 2. Conversely, all audio signals from the aircraft communications and navigation receivers are conditioned, mixed and routed to the cockpit headset and microphones 51. The audio management unit AMU also generates the audio tones that are played to the pilots after detection of a warning or caution.

In the preferred embodiment, the aircraft 100 is flown with the pilots wearing military style masks, which necessitates an intercom system. The audio management unit AMU controls the intercom using Voice Activation (VOX) for the cockpit headset and microphone 51. The VOX level is pre-set internally within the audio management unit AMU and cannot be changed. The volume control for the intercom is set on either the up front control panel UFCP as the primary method, or via the flight management system FMS as a back-up. The aircraft 100 is equipped with dual identical V/UHF transceivers V/UHF 1 and V/UHF 2. Selection of the frequency volume, and squelch on or off can be controlled via the up front control panel UFCP or the flight management system FMS. The squelch level is preset within the V/UHF 1 and V/UHF 2 and cannot be changed. For redundancy and to ensure greater coverage, the communications system 30 comprises two communication antennas comm. 1 antenna 33 and comm. 2 antenna 34. The comm. 2 antenna 34 is positioned preferably on the upper side of the aircraft 100 in the dorsal fin, while the comm. 1 antenna 33 is on the underside of the aircraft 100.

A training facility is incorporated whereby the student cockpit position can be inhibited from using comm. 2 antenna 34. This facility is initiated from the instructor cockpit position via a dedicated control on the glare-shield. The system has a time out feature to allow the student access to comm. 2 antenna 34 after a pre-determined period of time.

The communications system 30 of the aircraft 100 further comprises an emergency locator transmitter ELT able to operate on the common distress frequencies of 121.5, 243 and 406 MHz. On the 121.5 and 243 MHz frequencies, the system transmits the standard distress tone. On the 406 MHz range, the emergency locator transmitter ELT transmits a unique identifier for that particular aircraft 100 tail number. The emergency locator transmitter ELT antenna 37 is located on the forward edge of the vertical stabilizer of the aircraft 100 and can be controlled from the pilots console PC. This control is limited to switching the system on, off or performing a reset. The emergency locator transmitter ELT system incorporates an integral crash switch, which automatically initiates transmission on all three frequencies upon detection of a pre-determined g level.

According to the preferred embodiment of the present invention, dual mechanisms for tuning and control of the civil communications system 310 and the tactical communications system 320 are incorporated into the aircraft 100. The remote input output concentrator RIOC 'merges' the commands from the open systems mission computer OSMC and the flight management system FMS into a single command to the radios. This 'burst tuning' mechanism enables either the open systems mission computer OSMC or the flight management system FMS to command the radio without the need for a dedicated handover switch. Separate remote input output concentrators RIOC are used for each radio V/UHF 1 and V/UHF 2 to prevent the failure of a single remote input output concentrator RIOC affecting both radio channels.

The tactical control method for the radios V/UHF 1 and V/UHF 2 and the transponder 31 is the up front control panel UFCP. There is one up front control panel UFCP installed in each cockpit position. The frequencies, volume and squelch for the radios V/UHF 1 and V/UHF 2 can be selected on this panel. The transponder code and mode can also be selected. The data selections made on the up front control panel UFCP are sent to the open systems mission computer OSMC.

The flight management system FMS acts as the civil source of control for the communications system 30. All the communications control functions available on the up front control panel UFCP are duplicated on the flight management system FMS.

Figure 3A:
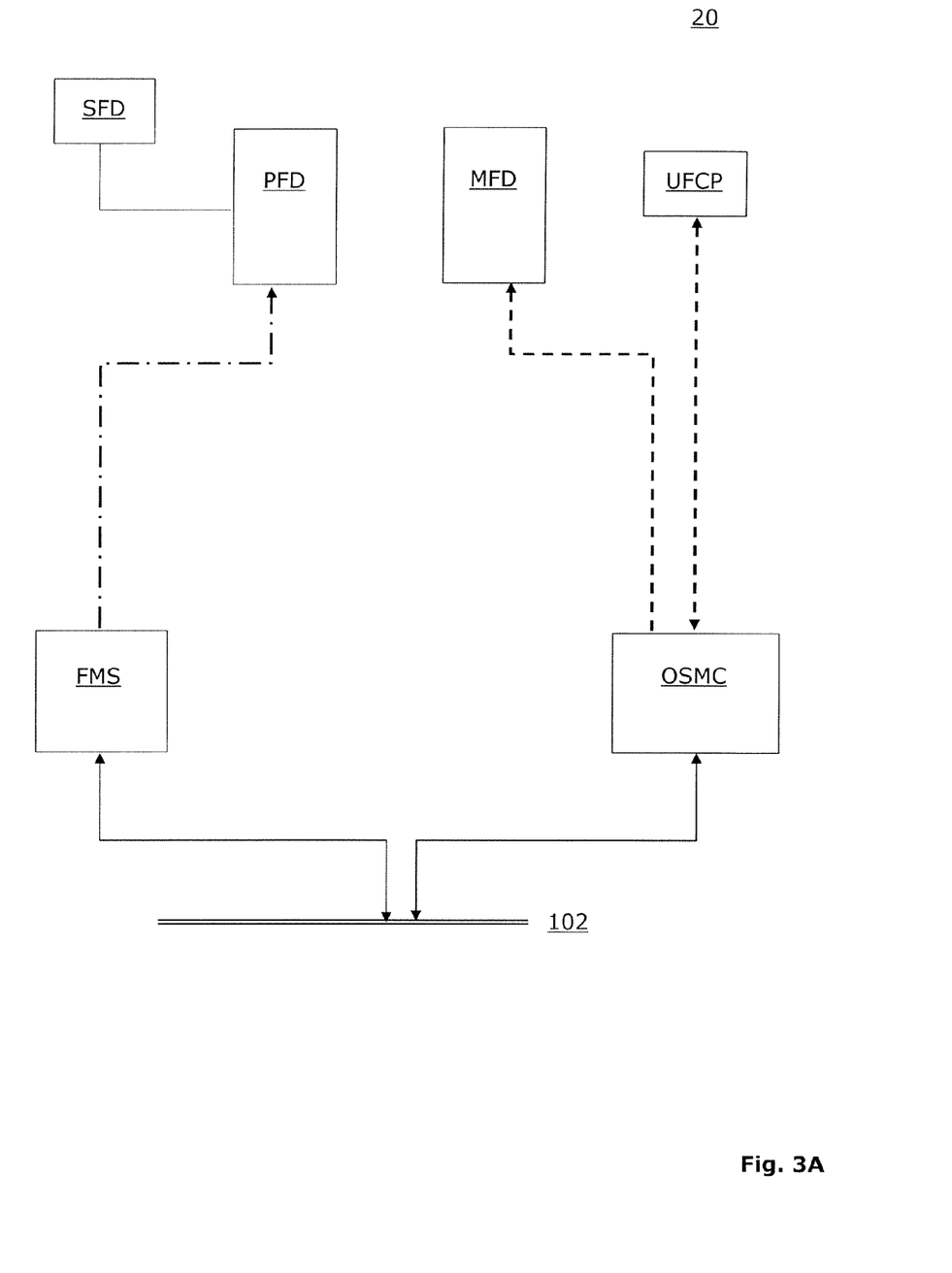
FIG. 3A is a structural block diagram depicting a first embodiment of the navigation system of the aircraft avionics system according to the present invention.

FIG. 3A shows a structural block diagram depicting a first embodiment of the navigation system 20 of the aircraft avionics system 10 according to the present invention. The navigation system 20 comprises several units that combine available navigation data to determine the best navigation solution.

The navigation system 20 is split into two distinct operational areas. These are the display of civil navigation data and the display of the tactical navigation data. The latter of these is used in the training environment. Isolation between these two sources of navigation data is maintained within the architecture of the aircraft avionics system 10.

As shown here, both the open systems mission computer OSMC and the flight management system FMS are connected to the I/O bus 102. Civil related connections are shown here with a dotted-dashed line and tactical connections with a dashed line. The pilot's interface with the civil navigation system 210 is the so-called primary flight display PFD and optionally a secondary flight display SFD, whereas the interface for the tactical navigation system 220 is the so-called multi-function display MFD. These instruments are kept independent of each other, both in terms of sources of data and supporting systems such as power supplies. Furthermore, the main display for the data associated with the civil navigation is the primary flight display PFD whereas the tactical navigation data is displayed on the multi-function display MFD, on the optional head-up display HUD and can optionally be selected for display on the primary flight display PFD. This provides the display of flight reference and navigation data to the pilot.

Figure 3B:
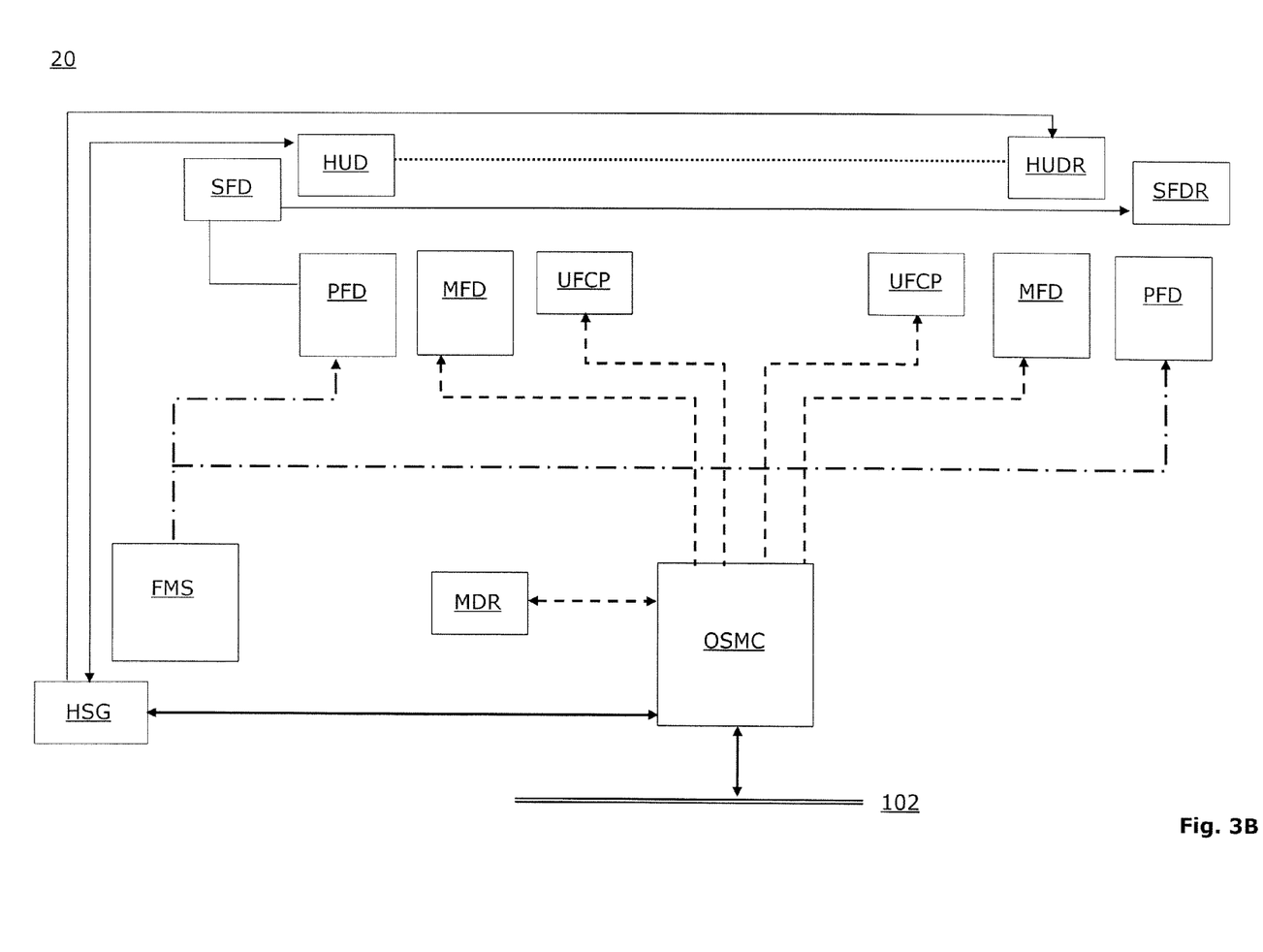
FIG. 3B is a structural block diagram depicting a preferred embodiment of the navigation system of the aircraft avionics system according to the present invention.

FIG. 3B shows a structural block diagram depicting a preferred embodiment of the navigation system 20 of the aircraft avionics system 10 according to the present invention. In this particular embodiment, the aircraft 100 comprises two cockpit positions each with dedicated controls, one cockpit position for a trainee and one for the instructor. Thus, the preferred embodiment of the navigation system 20 comprises dedicated primary flight displays PFD with corresponding secondary flight displays SFD, multi-function displays MFD and up front control panels UFCP for both cockpit positions. The civil navigation system 210 of the navigation system 20 and particularly the flight management system FMS provides the aircraft 100 with the Precision Area Navigation (PRNAV) and IFR capability for flying in civil airspace. The flight management system FMS contains a database for worldwide flying and can be used to train pilots in civil navigation for transport aircraft and other non-fighter applications. The flight management system FMS provides flight-plan and waypoint steering information to the primary flight display PFD.

To provide an alternate and independent indication of flight reference parameters to the crew, a secondary flight display system is installed. The secondary flight display system consists of a secondary flight display SFD and a secondary flight display repeater SFDR. The secondary flight display SFD is located in the front cockpit position and contains an inertial sensor package for computing airspeed and altitude. The secondary flight display repeater SFDR is located in the rear cockpit position and is a repeat of the display symbology presented on the secondary flight display SFD.

The tactical navigation data is displayed on the multi-function displays MFD, the optional head-up display HUD and can be optionally selected for display on the primary flight display PFD. In a further preferred embodiment of the present invention, there are two multi-function displays MFD installed in each cockpit position.

The head-up display HUD is installed in the front cockpit position, and incorporates a forward-looking camera. This camera produces a video image of the view ahead of the aircraft 100 for display on the rear seat head-up display repeater HUDR. The head-up display HUD symbology is superimposed over the image of the outside world on the head-up display repeater HUDR.

Tactical navigation data is planned prior to the mission, and taken to the aircraft on a removable memory module. This is inserted into a mission data recorder MDR, which reads the data and passes it to the open systems mission computer OSMC for the creation of the appropriate commands for the display of the route on the multi-function displays MFD, head-up display HUD, head-up display repeater HUDR or primary flight display PFD, as selected by the pilot.

Furthermore, the data from the navigation sensors are provided to the open systems mission computer OSMC via the I/O bus 102 to determine the aircraft position along the planned route. This information is used to update the display of the tactical navigation route on the selected display. If the route is displayed on the multi-function display MFD, the pilot has the option to select the route to be overlaid on a digital map of the area.

Figure 4:
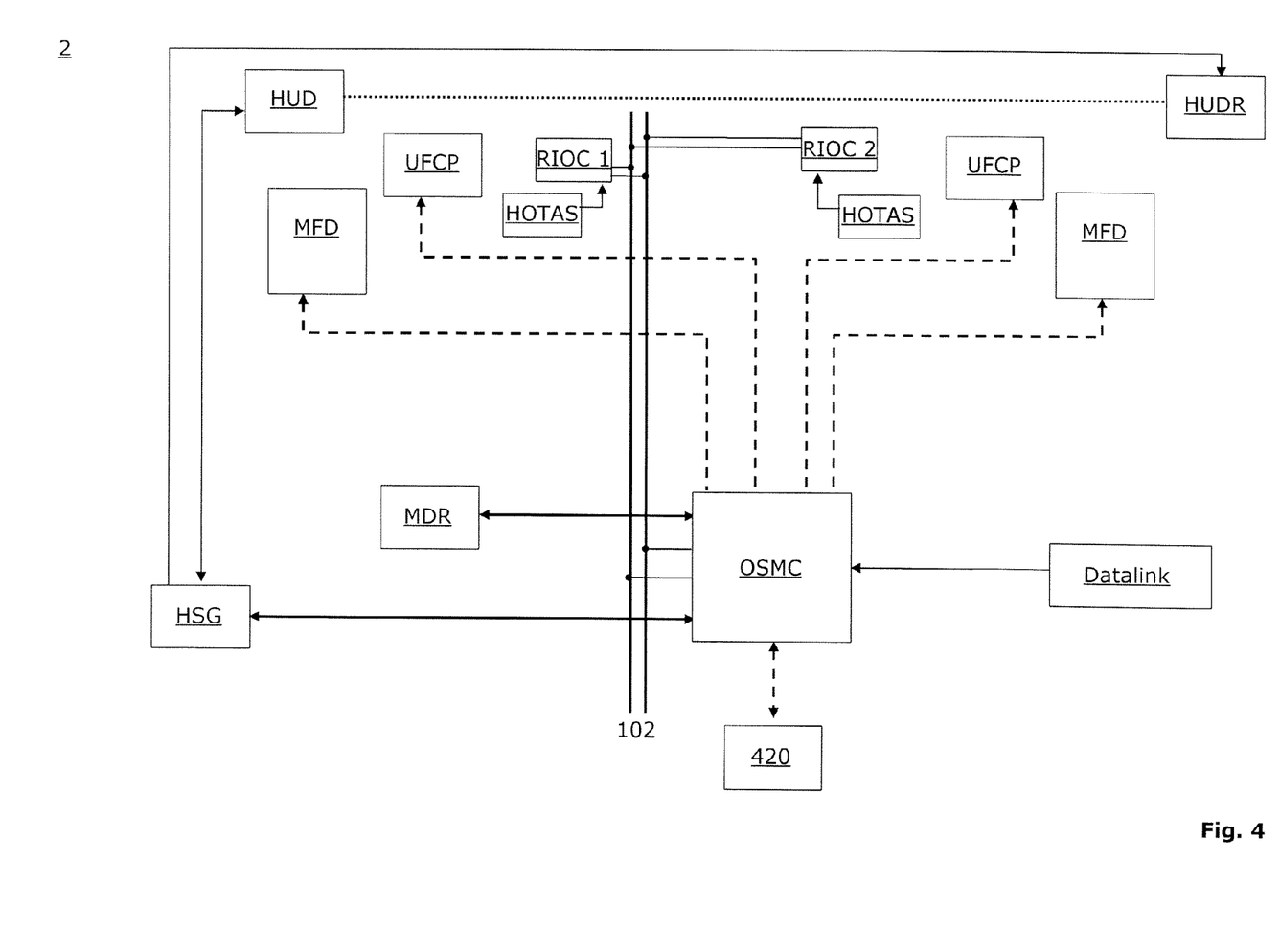
FIG. 4 is a structural block diagram depicting the mission system according to the present invention.

FIG. 4 shows a structural block diagram depicting the mission system 2 according to the present invention. The mission system 2 of the aircraft 100 is provided to enhance the training role and provide students with simulated displays of functions that are found in modern military aircraft. As such, only tactical functions are provided as part of the mission system 2. These functions include the provision of simulated weapons packages for both air-to-air and air-to ground scenarios, synthetic radar displays, simulated electronic warfare displays and datalink. The architecture of the mission system 2 can be seen on FIG. 4.

The heart of the Mission System is the open systems mission computer OSMC. This contains the majority of processing for the system. Communication to the open systems mission computer OSMC is generally via the I/O bus 102, this being the prime means of communication with the remote input output concentrators RIOC. The presentation of the simulated training displays is presented on the multi-function displays MFD and the optional head-up display HUD. The head-up display HUD provides the active weapon release cues for the pilot to follow. Aircraft body rate data is supplied by the navigation system 20 to the mission system 2 to permit the release cues to respond to aircraft 100 movements in real time. The multi-function displays MFD present the head down displays of simulated weapons, radar and electronic warfare training pages. Selection of the format for display is executed via a variety of cockpit switches. The hands on throttle and stick HOTAS provides a number of functions to allow the pilot to effectively manage the aircraft avionics system 10. Such functions include, but are not limited to, the display selection switches, simulated air-to air and air-to-ground weapon release buttons and simulated radar mode selections. The discrete interfaces from the hands on throttle and stick HOTAS are routed to the open systems mission computer OSMC via the remote input output concentrators RIOC. These remote input output concentrators RIOC are preferably located within the airframe to minimize the amount of aircraft wiring required.

In addition to the upload of data from the mission data recorder MDR to the aircraft 100, the mission data recorder MDR has the capability to record the data used to generate all cockpit displays, including those that are not selected for display. This is a useful training aid for post flight debriefing of student pilots.

In a preferred embodiment of the present invention, the mission system 2 has the ability to subject student pilots to increased workload by temporarily simulating the failure of certain equipment during a training mission. The equipment can be selected for blanking via the instructor's multi-function display MFD. Equipment in the students cockpit position that can be blanked includes the up front control panel UFCP the head-up display HUD and the multi-function display MFD displays. All simulated equipment failures can be reset from the instructor cockpit position. Furthermore, the provision of a training system 420 provides the possibility to simulate additional systems typically available on a military aircraft. Thus the training system 420 performs additional functions such as simulated radars, simulated warfare, etc in order to provide a much more realistic training environment.

Figure 5:
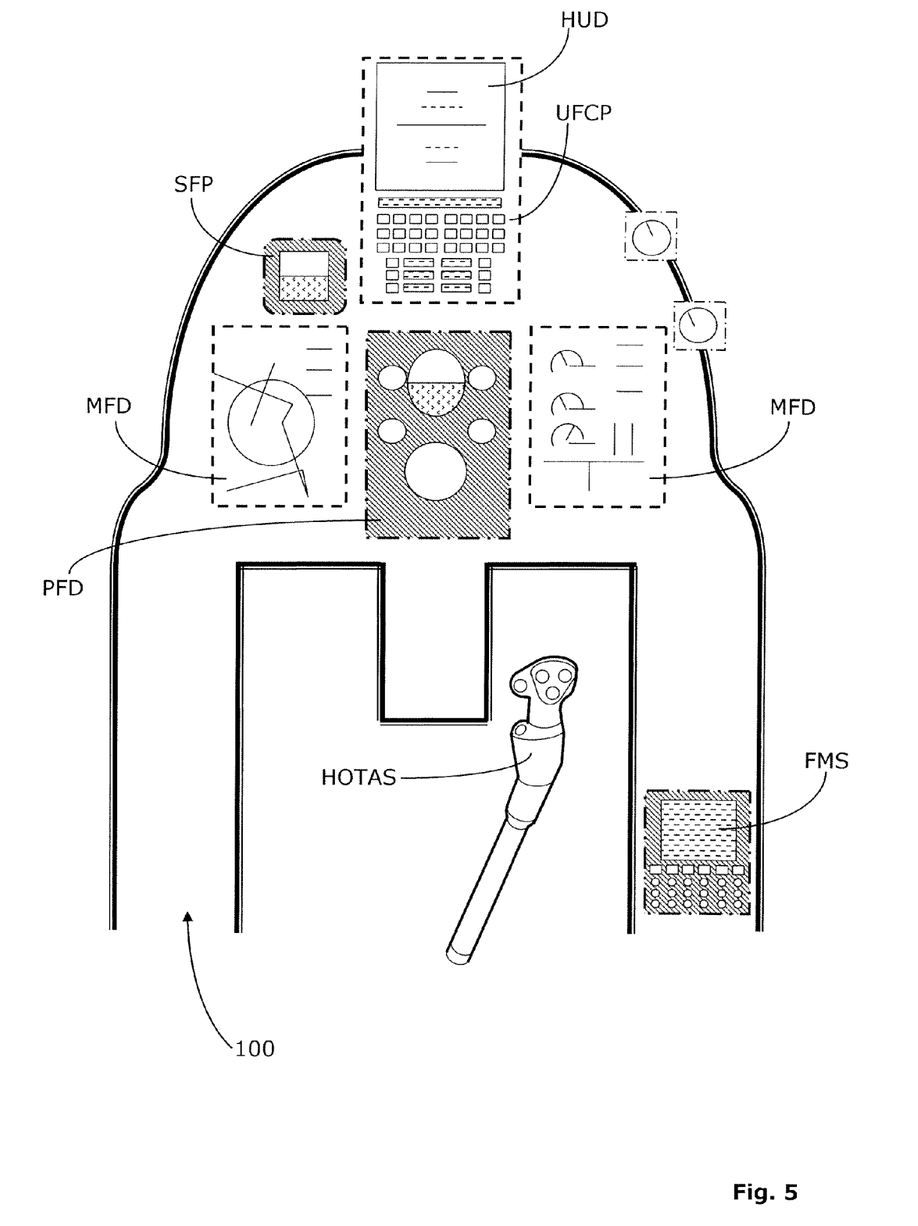
FIG. 5 is a typical layout of the cockpit of an aircraft depicting the logical separation of the mission system from the civil system.

FIG. 5 shows a typical layout of the cockpit of an aircraft 100 depicting the logical separation of the civil system 1 from the mission system 2. Controls and displays part of the civil system 1 are shown with dotted-dashed lines and controls belonging to the mission system 2 shown with dashed lines. The logical separation of the civil system 1 from the mission system 2 can be seen on this figure as well, wherein a lean, structured layout is proposed, with a clear separation of the training functionalities form the civil functionalities of the aircraft 100.

To summarize the present invention, the mission system 2 of the aircraft 100 is split from the civil system 1 of the aircraft 100 through separation of systems and individual avionic units. All civil functions can take place without reference to mission system 2. This concept allows the mission system 2 to be updated and maintained at a unique rate with little effort with regard to the civil system 1.

It will be understood that many variations could be adopted based on the specific structure hereinbefore described without departing from the scope of the invention as defined in the following claims.

What is claimed is:

1. An aircraft avionics system for an aircraft, comprising:
   a mission system comprising a tactical communications system, a tactical navigation system, a training system and an open systems mission computer that controls the mission system; and
   a civil system, controlled by a flight management system, comprising a civil communications system and a civil navigation system,
   wherein said mission system and said civil system are logically separated from each other through (i) separation of an aircraft navigation system into said civil navigation system and said tactical navigation system, (ii) separation of an aircraft communications system into said tactical communications system and said civil communications system, and (iii) independence of the open systems mission computer from the flight management system,
   thereby providing full separation of aircraft civil functionalities from aircraft tactical functionalities, allowing the civil system to operate independently from the mission system, and allowing updating and maintenance of the mission system independently from the civil system.

2. An aircraft avionics system according to claim 1, further comprising an electrical system and a lighting system.

3. An aircraft avionics system according to claim 2, wherein the lighting system comprises an internal lighting system and an external lighting system.

4. An aircraft avionics system according to claim 1, wherein said aircraft communications system further comprises an audio management unit configured to control all audio signals within the aircraft.

5. An aircraft avionics system according to claim 4, wherein said aircraft communications system further comprises:
   a remote input and output concentrator configured to merge commands from the open systems mission computer and the flight management system into a single command to at least one radio;
   at least one of (i) a cockpit headset and microphone and (ii) a ground crew headset and microphone, connected to the audio management unit; and
   an emergency locator transmitter configured to transmit distress signals.

6. An aircraft avionics system according to claim 1, wherein said aircraft navigation system further comprises a primary flight display interfacing with the civil navigation system and a multi-function display interfacing with the tactical navigation system.

7. An aircraft avionics system according to claim 1, wherein said tactical navigation system further comprises a mission data recorder configured to read mission data and pass said mission data to the open systems mission computer.

8. An aircraft avionics system according to claim 1 in combination with an aircraft, wherein:
   said aircraft comprises a front cockpit position and a rear cockpit position; and
   said aircraft navigation system further comprises a head-up display located in said front cockpit position and a head-up display repeater located in said rear cockpit position, said head-up display having a camera configured to produce a video image of the view ahead of the aircraft for display on the head-up display repeater, wherein head-up display symbols are superimposed over said video image.

9. An aircraft avionics system according to claim 1 in combination with an aircraft, wherein:
   said aircraft comprises a front cockpit position and a rear cockpit position; and
   said civil navigation system further comprises a secondary flight display system comprising
      a secondary flight display, located in said front cockpit position, having an inertial sensor package configured to compute aircraft airspeed and altitude, and a secondary flight display repeater located in said rear cockpit position, configured to display a copy of the secondary flight display.

10. An aircraft avionics system according to claim 1, wherein said open systems mission computer has an up front control panel configured to interface with a pilot.

11. An aircraft avionics system according to claim 1, further comprising a hands on throttle and stick with interfaces routed to the open systems mission computer via at least one remote input output concentrator.

12. An aircraft avionics system according to claim 1, wherein at least one of (i) said open systems mission computer and (ii) said flight management system are connected to an I/O bus of an aircraft.

13. An aircraft avionics system according to claim 1 in combination with an aircraft, wherein:
- said aircraft comprises a front cockpit position and a rear cockpit position;
- said front cockpit position and said rear cockpit position each comprise a primary flight display; a multi-function display; an up front control panel; a hands on throttle and stick; and a cockpit headset and microphone;
- said front cockpit position further comprises a secondary flight display and a head-up display; and
- said rear cockpit position further comprises a secondary flight display repeater and a head-up display repeater.

* * * * *